United States Patent [19]
Hahn et al.

[11] Patent Number: 4,983,639
[45] Date of Patent: Jan. 8, 1991

[54] EXPANDABLE STYRENE POLYMERS AND THEIR PREPARATION

[75] Inventors: Klaus Hahn, Kirchheim; Uwe Guhr, Gruenstadt; Hans Hintz, Ludwigshafen, all of Fed. Rep. of Germany

[73] Assignee: BASF Aktiengesellschaft, Ludwigshafen, Fed. Rep. of Germany

[21] Appl. No.: 486,434

[22] Filed: Feb. 28, 1990

[30] Foreign Application Priority Data

Mar. 14, 1989 [DE] Fed. Rep. of Germany ....... 3908238

[51] Int. Cl.$^5$ .............................. C08J 9/18; C08J 9/20
[52] U.S. Cl. ......................................... 521/59; 521/56; 521/60; 521/139
[58] Field of Search ...................... 521/56, 59, 60, 139

[56] References Cited

U.S. PATENT DOCUMENTS 2,700,185  1/1955  Lee .
3,361,687  1/1968  Stahnecker .
4,708,968  11/1987  Ingram ................................... 521/56
4,937,272  6/1990  Sumitomo .............................. 521/59

FOREIGN PATENT DOCUMENTS 1494934  of 0000  Fed. Rep. of Germany .
1368544  of 0000  France .

OTHER PUBLICATIONS

Chemical Abstracts, vol. 90, No. 8, Feb. 1979, p. 40, Abstract No. 55835q.

Primary Examiner—Morton Foelak
Attorney, Agent, or Firm—Oblon, Spivak, McClelland, Maier & Neustadt

[57] ABSTRACT

Expandable styrene polymers of from 95 to 99.5% by weight of polystyrene and from 0.15 to 5% by weight of a styrene-soluble styrene/acrylonitrile copolymer having a total content of not less than 0.15% by weight of acrylonitrile, which contain from 3 to 10% by weight of a $C_3$–$C_6$-hydrocarbon and may contain conventional additives, give foams which do not shrink. The said styrene polymers can be prepared by suspension polymerization of a solution of the styrene/acrylonitrile copolymer in styrene.

3 Claims, No Drawings

EXPANDABLE STYRENE POLYMERS AND THEIR PREPARATION

Foams based on styrene/acrylonitrile copolymers have become important industrially owing to their non-shrink foam properties. For their production, a mixture of styrene and acrylonitrile is polymerized in aqueous suspension in the presence of a blowing agent. The resulting expandable copolymer can be expanded to give foam beads and further processed by welding to give any shaped foam articles.

Owing to the high toxicity of the acrylonitrile, suspension polymerization is particularly hazardous. Disposal of the acrylonitrile-containing wastewater also presents problems.

It is an object of the present invention to produce non-shrink expandable styrene polymers by a safe and environmentally compatible process in which no toxic wastewaters are obtained.

We have found, surprisingly, that this object is achieved and that expandable styrene polymers based on a mixture of polystyrene and styrene-soluble styrene/acrylonitrile copolymers are suitable for the production of non-shrink foams, and that these products can be produced in a simple and safe manner by suspension polymerization of a solution of styrene/acrylonitrile copolymers in styrene.

It was not possible for the skilled worker to foresee that such products would be free of shrinkage, since polystyrene, the main component, does not give non-shrink foams.

The present invention therefore relates to expandable styrene polymers containing (a) from 95 to 99.5% by weight of polystyrene, (b) from 0.5 to 5% by weight of a styrene-soluble styrene/acrylonitrile copolymer, the content of acrylonitrile being not less than 0.15% by weight, based on the sum of (a) and (b), and (c) from 3 to 10% by weight, based on the sum of (a) and (b), of a $C_3$–$C_6$-hydrocarbon as a blowing agent, with or without (d) conventional additives in effective amounts.

The products contain, as the main component (a), polystyrene in an amount of from 95 to 99.5, preferably from 95 to 99, % by weight, based on the sum of (a) and (b). The polystyrene advantageously contains a small amount of a crosslinking agent as polymerized units, i.e. a compound having more than one polymerizable double bond, preferably two polymerizaole double bonds, such as divinylbenzene, butadiene or butanediol diacrylate. The crosslinking agent is generally used in an amount of from 0.005 to 0.05 mol %, based on styrene.

The products contain, as a further component (b), a styrene-soluble styrene/acrylonitrile copolymer in an amount of from 0.5 to 5, preferably from 1 to 5, % by weight, based on the sum of (a) and (b). The copolymers generally contain about 10–35, in particular 20–30, % by weight of polymerized acrylonitrile. If the acrylonitrile content is too high, the copolymers are no longer soluble in styrene.

With regard to its amount and its acrylonitrile content, component (b) is chosen so that the content of polymerized acrylonitrile is not less than 0.5, in general from 0.15 to 2, preferably from 0.5 to 1.5, % by weight, based on the sum of (a) and (b). The copolymer generally has a melt flow index MFI (g/10 min) of from 0.5 to 10.5, preferably from 1.5 to 2.0, measured according to DIN 53,735. The mixture of polystyrene and the styrene/acrylonitrile copolymer, without a blowing agent, generally has a melt flow index MFI (g/10 min) of from 1.0 to 2.2, preferably from 1.5 to 2.0, measured according to DIN 53,735.

The expandable styrene polymers contain, as a conventional blowing agent, from 3 to 10, preferably from 5 to 8, % by weight, based on the sum of (a) and (b), of a $C_3$–$C_6$-hydrocarbon, such as propane, butane, isobutane, n-pentane, isopentane, neopentane and/or hexane. A commercial pentane isomer mixture is preferably used.

The products may contain, as further additives, conventional dyes, fillers, stabilizers, flameproofing agents, synergistic agents, nucleating agents, lubricants and the like, in conventional effective amounts.

The expandable styrene polymers are generally in the form of particles, i.e. in the form of beads, granules or lumps, and advantageously have a mean diameter of from 0.1 to 6 mm, in particular from 0.4 to 0.3 mm. Preparation may be effected, for example, by mixing the components in the melt in an extruder, the extrudate being cooled so rapidly after extrusion that no foaming occurs, and then being comminuted.

The preparation is advantageously carried out by suspension polymerization in a conventional manner. For this purpose, the styrene/acrylonitrile copolymer, usually a commercial product, is dissolved in styrene, and this solution is polymerized in aqueous suspension. A small amount, about 0.005–0.05 mol %, based on styrene, of a crosslinking agent is advantageously added during the polymerization. The blowing agent can be initially taken in the polymerization or can be added in the course of the polymerization. It may furthermore be added to the mixture only after polymerization is complete.

The bead-like expandable styrene polymers obtained are then isolated from the aqueous phase, washed and dried.

In the Examples, parts are by weight.

EXAMPLE 1

In a pressure-resistant stirred kettle, a mixture of 200 parts of water, 0.1 part of sodium pyrophosphate, 100 parts of a solution of 0.01 part of divinylbenzene and 5 parts of a styrene/acrylonitrile copolymer (70/30% by weight), having a melt flow index (g/10 min) of 1.9, in 95 parts of styrene, 7 parts of pentane, 0.15 part of tert-butyl peroxide, 0.45 part of benzoyl peroxide, 0.7 part of hexabromocyclododecane (flameproofing agent) and 4 parts of a 10% strength aqueous solution of polyvinylpyrrolidone was heated to 90° C. while stirring, kept at this temperature for 5 hours and then heated at 100° C. for 2 hours and at 120° C. for a further 2 hours. After the mixture had cooled, the resulting bead polymer having a mean particle diameter of about 1 mm was isolated from the aqueous phase, washed and dried.

The expandable styrene polymer obtained was preexpanded to a bulk density of 20 g/1 in a commercial Rauscher type stirred pre-expander, using flowing steam. After storage for 24 hours, the foam particles were welded in a Rauscher-type block mold by treatment with steam and under a pressure of 1.8 bar to give a block (100×100×30 cm).

To test the shrinkage behavior, the inward curvature, based on the block thickness, of the two lateral surfaces (100×100 cm²) of the foam blocks is measured. If, for example, the inward curvature of both lateral surfaces together is 1.5 cm, the degree of shrinkage for a block thickness of 30 cm is 5%.

The results are summarized in the Table.

EXAMPLE 2

The procedure described in Example 1 was followed, except that 100 parts of a solution of 0.01 part of divinylbenzene and 4 parts of the styrene/acrylonitrile copolymer in 96 parts of styrene were used.

EXAMPLE 3

The procedure described in Example 1 was followed, except that 100 parts of a solution of 0.01 part of divinylbenzene and 3 parts of the styrene/acrylonitrile copolymer in 97 parts of styrene were used.

EXAMPLE 4

The procedure described in Example 1 was followed, except that divinylbenzene was absent.

EXAMPLE 5 (Comparison)

The procedure described in Example 1 was followed, except that 100 parts of a solution of 0.1 part of the styrene/acrylonitrile copolymer in 99.9 parts of styrene were used.

EXAMPLE 6 (Comparison)

The procedure described in Example 1 was followed, except that 100 parts of a solution of 0.01 part of divinylbenzene in styrene were used.

EXAMPLE 7 (Comparison)

The procedure described in Example 6 was followed, except that divinylbenzene was absent.

TABLE

| Example | (a) Polystyrene % by weight | (b) SAN copolymer % by weight | a + b AN content % by weight | Degree of shrinkage [%] |
| --- | --- | --- | --- | --- |
| 1 | 95 | 5 | 1.5 | 1.5 |
| 2 | 96 | 4 | 1.2 | 2.6 |
| 3 | 97 | 3 | 0.9 | 5.1 |
| 4 | 95 | 5 | 1.5 | 2.1 |
| 5 | 99.9 | 0.1 | 0.03 | 10.5 |
| 6 (Comparison) | 100 | 0 | 0 | 11.0 |
| 7 (Comparison) | 100 | 0 | 0 | 11.2 |

We claim:
1. An expandable styrene polymer containing
   (a) from 95 to 99.5% by weight of polystyrene,
   (b) from 0.5 to 5% by weight of a styrene-soluble styrene/acrylonitrile copolymer, the content of acrylonitrile being not less than 0.15% by weight, based on the sum of (a) and (b), and
   (c) from 3 to 10% by weight, based on the sum of (a) and (b), of a $C_3$-$C_6$-hydrocarbon as a blowing agent, with or without
   (d) conventional additives in effective amounts.
2. An expandable styrene polymer as claimed in claim 1, wherein the polystyrene has been prepared in the presence of from 0.005 to 0.05 mol % of a crosslinking agent.
3. A process for the preparation of an expandable styrene polymer as claimed in claim 1 or 2, wherein the styrene/acrylonitrile copolymer is dissolved in styrene and polymerized in aqueous suspension, and the blowing agent is added during or after the polymerization.

* * * * *